United States Patent

Rao

[11] Patent Number: 5,943,164
[45] Date of Patent: Aug. 24, 1999

[54] CURVED 3-D OBJECT DESCRIPTION FROM SINGLE AERIAL IMAGES USING SHADOWS

[75] Inventor: Kashipati Rao, Richardson, Tex.

[73] Assignee: Texas Instruments Incorporated, Dallas, Tex.

[21] Appl. No.: 08/338,073

[22] Filed: Nov. 14, 1994

[51] Int. Cl.$^6$ ............... G02B 27/22; G06G 7/48; G01B 00/00; G06F 15/00
[52] U.S. Cl. .............. 359/462; 395/118; 395/119; 364/578; 364/559
[58] Field of Search ............... 395/94, 119, 120; 364/578, 462, 559; 359/465; 348/135

[56] References Cited

U.S. PATENT DOCUMENTS 4,873,651  10/1989  Raviv ........................... 364/578

Primary Examiner—Cassandra Spyrou
Assistant Examiner—Audrey Chang
Attorney, Agent, or Firm—Bret J. Petersen; Richard L. Donaldson

[57] ABSTRACT

This is a system and method of describing 3-D objects from single aerial images using shadows. The method may include using object shadow information to extract generalized cone description (sweep rule, cross-section and axis). Additionally, this generalized cone information may then be used to reconstruct a 3-D object. The method may model curved 3-D objects, such as curved buildings, cooling towers, chimneys and oil tanks in aerial images, as generalized cones.

5 Claims, 6 Drawing Sheets

STRAIGHT AXIS
HOMOGENEOUS CROSS-SECTION
GENERALIZED
CONE

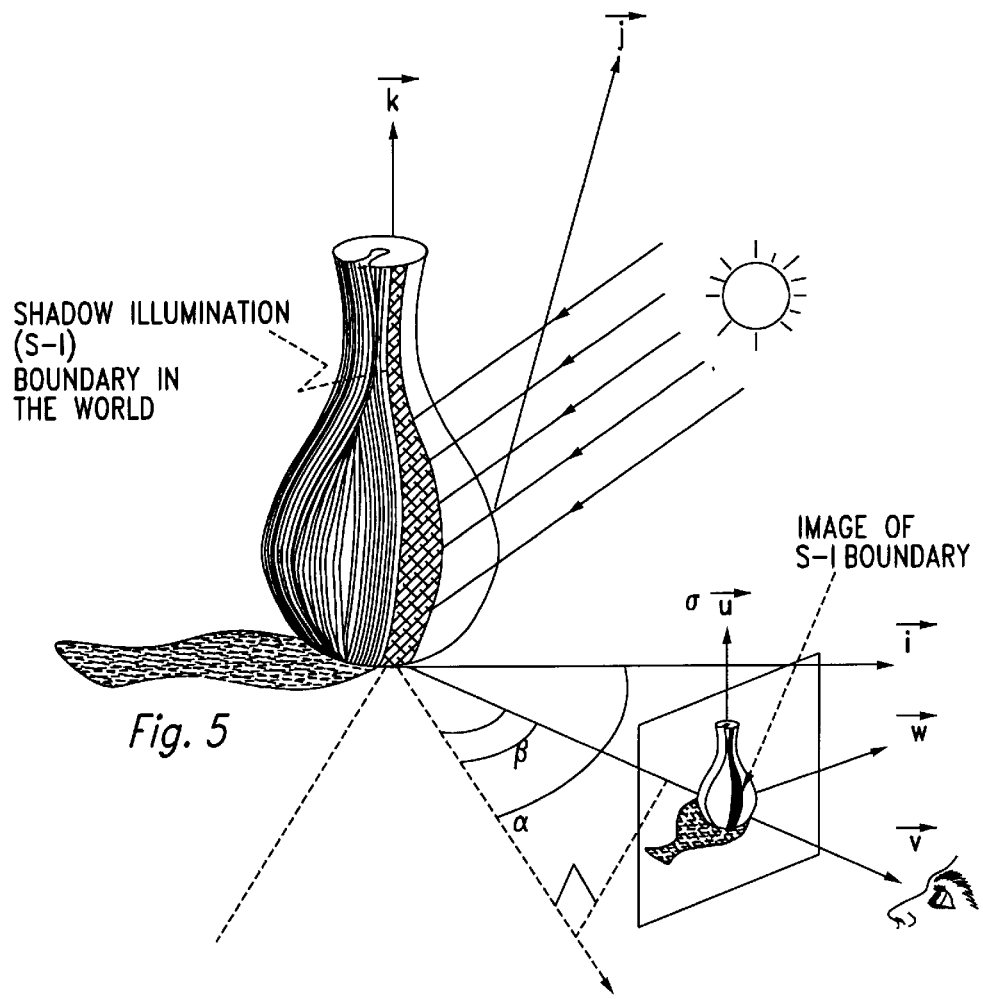
Fig. 5
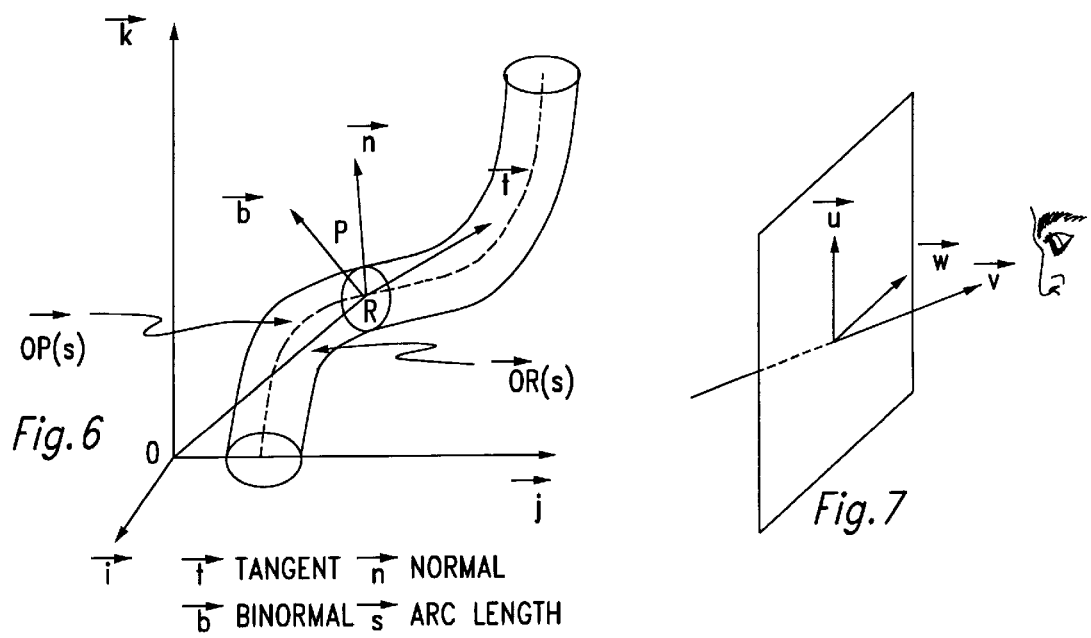
Fig. 6
t⃗ TANGENT   n⃗ NORMAL
b⃗ BINORMAL  s⃗ ARC LENGTH
Fig. 7

CURVED 3-D OBJECT DESCRIPTION FROM SINGLE AERIAL IMAGES USING SHADOWS

FIELD OF THE INVENTION

The field of the invention relates to image recognition of three dimensional (3-D) objects utilizing shadows.

BACKGROUND

Image recognition of 3-d objects can be very advantageous to a variety of applications. These applications can range from creating models for mapping sites with curved objects (e.g., curved buildings); automatic mensuration of curved objects (e.g., oil tank capacity estimation); and enabling pre-mission briefing of future missiles for targets in areas of curved 3-D objects. A potential user of this technology is RADIUS [S. J. Gee and A. M. Newman. RADIUS: Automating Image analysis through model-supported exploitation. In *Proceedings of the DARPA Image Understanding Workshop*, pages 185–196, Washington, D.C., April 1993. Morgan Kaufmann Publishers.]. For example, because the presence of several curved 3-D objects may hinder the current RADIUS system, the ability for image recognition of 3-D objects would only benefit the system.

SUMMARY OF THE INVENTION

However, the main problems in image recognition of 3-D objects are the following: Segmentation: identification of object regions and shadow regions; Correspondence: correspondence between object and shadow regions; Shape inference: inference of shape from the shadow and the view of the object.

The present invention provides a method of shape inference. In addition, the present invention addresses the problem of describing the shape of curved 3-D objects from single aerial images in the presence of shadows.

The present invention first recovers the generalized cone description (sweep rule, cross-section and axis) of an object from a single aerial image using shadows. The 3-D object is then reconstructed.

In addition, the present invention includes a method for shape description of curved 3-D objects from single aerial images using shadows. The method may include using object shadow information to extract generalized cone description (sweep rule, cross-section and axis). Additionally, this generalized cone information may then be used to reconstruct a 3-D object. The method may model curved 3-D objects, such as curved buildings, cooling towers, chimneys and oil tanks in aerial images, as generalized cones.

BRIEF DESCRIPTION OF THE DRAWINGS

This invention can be best understood by reference to the following drawing(s), in which:

FIG. 5 shows a schematic with the geometry for shadow and imaging of the shadow;

FIG. 6 shows an illustration describing the setup of the vector equation for a point on the generalized cone;

FIG. 7 shows an illustration describing the coordinate system for viewing;

Corresponding numerals and symbols in different figures refer to corresponding parts unless otherwise indicated.

DETAILED DESCRIPTION OF PREFERRED EMBODIMENTS

Figure 1:
FIG. 1 shows an image obtained from Rome Laboratories/IRRE.

One preferred embodiment will be described with the aid of FIGS. 1–17. FIG. 1 shows an example real image obtained from the Image Exploitation Laboratory, Rome Laboratories/IRRE. For this figure, auxiliary information such as latitude, longitude, time of day and date was available. Ground truth and viewpoint direction information, however, was not available. In addition, some images may be available as stereo pairs.

The present invention models curved 3-D objects in terms of the generalized cone. A generalized cone or a generalized cylinder (GC) consists of an arbitrary planar shape, called a cross-section, swept along an arbitrary 3-D curve, called an axis, $\overrightarrow{O}\overrightarrow{R}$. Further, the size and also shape of the cross-section may change along the axis; the rule describing the cross-section shape and size at every point along the axis is called the cross-section function.

The cross-section function may be represented as one function, $u(s,\theta)$, or for a homogeneous GC, as a product of two functions, the cross-section, $\rho(\theta)$, (or the contour function defined by S. A. Shafer and T. Kanade. [The theory of straight homogeneous generalized cylinders and a taxonomoy of generalized cylinders. Technical Report CMU-CS-83-105, Carnegie-Mellon University, January 1983.]), and the sweep rule, r(z) (or the radius function defined by S. A. Shafer and T. Kanade, supra). The sweep rule describes how the size of the cross-section changes, the shape being constant. The eccentricity of the generalized cone is the angle between the axis (or the tangent to the axis) and the plane containing the cross-section. For purposes of this embodiment, the angle is assumed to be 90 degrees, that is, right generalized cones. In referring to specific classes of GCs, the terminology in S. A. Shafer and T. Kanade, supra. will be used. The classes of generalized cones are the following:

Straight (axis) homogeneous (cross-section) generalized cone (SHGC)
Right circular (cross-section) SHGC (RCSHGC) or solid of revolution (SOR)
Linear (linear sweep rule) SHGC (LSHGC)
Right circular (cross-section) LSHGC (RCLSHGC)
Constant (constant sweep rule) SHGC (CSHGC)
Right circular (cross-section) CSHGC (RCCSHGC)

Figure 3:
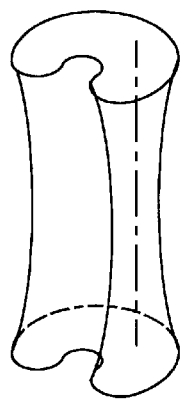
FIG. 3 shows a schematic for an example SHGC.

FIG. 3 shows an example of an SHGC.

The present invention will recover the generalized cone description (sweep rule, cross-section and axis) of an object from a single aerial image using shadows. The 3-D object is then reconstructed.

Figure 2:
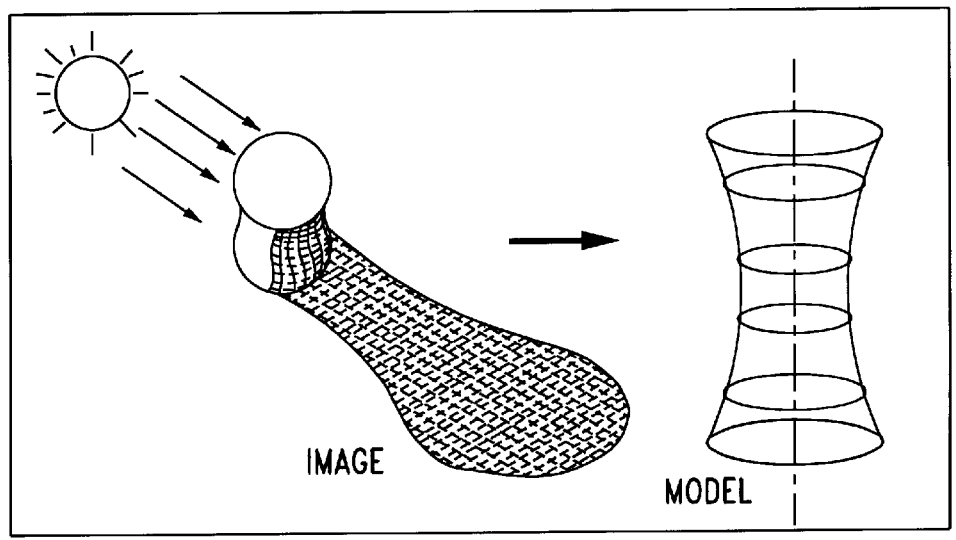
FIG. 2 shows a schematic which illustrates the input and desirable output.

As can be seen from FIG. 2, the shadow of the object may be considered to have 2 components. One component is the "sides" of the shadow intuitively due to the sweep rule of the generalized cone. The other is the "ends" of the shadow due to the ends of the object. When the object has flat ends parallel to its cross-section, the ends are the same as the cross-section of the object. So the sides of the shadow give cues to the sweep rule of the generalized cone description of the object. The ends of the shadow give cues to the cross-section of the generalized cone. The axis of the shadow gives cues to the axis of the generalized cone.

Figure 4A:
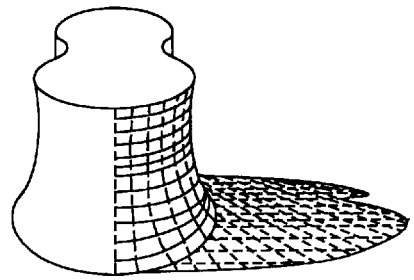
FIG. 4 shows a simplification of a shadow-casting solid object to an opaque sheet: (a) a solid object (describable as an SHGC) with a shadow; (b) an equivalent opaque sheet casing the same shadow.
Figure 4B:
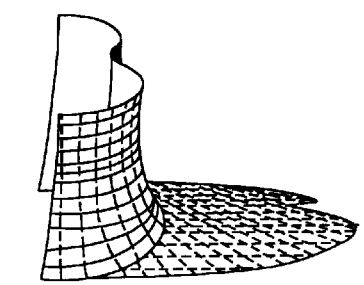

FIG. 4 also illustrates some of these ideas by simplifying a shadow-casting solid object to an equivalent opaque sheet. Note that shadow boundaries may be due to either orientation discontinuities or depth discontinuities (where the surface normal is perpendicular to the sun rays) at the boundaries of the object. For a smooth cross-section GC, shadow ends are due to orientation discontinuities at GC ends, and shadow sides are due to depth discontinuities. FIG. 4 also illustrates how the sides and ends of the shadow give cues to the sweep rule and cross-section of the generalized cone.

For this embodiment, the axis of the generalized cone is assumed to be straight. The cross-section could be general, but the special case of circular cross-section is also addressed. The sweep rule could also be general, but special attention to the cases of linear and constant sweep rules are also addressed.

Theory for Shadow-Illumination Boundary

The aim of this section is to recover the sweep rule of the SHGC from its shadow-illumination boundary. The shadow-illumination boundary is the boundary between the shadowed part of the object and the illuminated part of the object (FIG. 5). An expression for the image of the shadow-illumination boundary is found given the illumination direction and the viewpoint direction. For simplicity, parallel rays and orthographic projection are assumed.

FIG. 6 illustrates the setup of the vector equation for a point on a homogeneous generalized cone. Then any point on the surface of the homogeneous generalized cone is given by Equation (1) below. The following denotations will be made for brevity: sin by s, cos by c, and tan by t. For example, sin $\theta$ by s$\theta$, cos $\theta$ by c$\theta$, and tan $\sigma_0$ by t$\sigma_0$. In addition, $\vec{n}$ and $\vec{b}$ are unit vectors.

$$\vec{OP} = \vec{OR} + u(s,\theta)(c\theta \vec{n} + s\theta \vec{b}) \qquad (1)$$

For a straight homogeneous generalized cone (SHGC), the axis of the generalized cone is aligned with the z-axis (or $\vec{k}$-axis) of the world coordinate system. Then any point on the SHGC is given by Equation (2) below. $\vec{i}$, $\vec{j}$ and $\vec{k}$ are unit vectors.

$$\vec{OP} = r(z)\rho(\theta)(c\theta \vec{i} + s\theta \vec{j}) + z\vec{k} \qquad (2)$$

The surface normal is $$\vec{N}_{surf} = (\rho'rs\theta + \rho rc\theta)\vec{i} + (-\rho'rc\theta + \rho rs\theta)\vec{j} - \rho r\rho'\vec{k} \qquad (3)$$

Without loss of generality, we choose the $\vec{i}$ and $\vec{j}$ axes so that the illumination vector, $\vec{l}$, is in the $\vec{i}$-$\vec{k}$ plane. Let the illumination vector, $\vec{l}$, make an angle $\sigma$ with respect to the $\vec{i}$-axis. Then the illumination vector, $\vec{l}$, is given by $$\vec{l} = c\sigma \vec{i} + 0\vec{j} + s\sigma \vec{k} \qquad (4)$$

Then the shadow-illumination (S-I) boundary is given by the following condition:

$$\vec{N}_{surf} \cdot \vec{l} = 0$$

or $$-\rho r \rho' s\sigma + (\rho'rs\theta + \rho rc\theta)c\sigma = 0$$

or $$\rho's\theta + \rho c\theta = r'(z)\rho^2 t\sigma \qquad (5)$$

The image of the shadow-illumination (S-I) boundary is then derived (see FIG. 5). Consider a view vector $\vec{v}_i$ with longitude $\alpha_i$ and latitude $\beta_i$ (spherical coordinates). Then $\vec{v}_i = c\beta_i c\alpha_i \vec{i} + c\beta_i s\alpha_i \vec{j} + s\beta_i \vec{k}$. Consider an image plane perpendicular to $\vec{v}_i$ as shown in the figure with coordinate axes $\vec{w}_i$ and $\vec{u}_i$ such that $\vec{v}_i \cdot \vec{w}_i = 0$ and $\vec{v}_i \times \vec{w}_i = \vec{u}_i$. Then, without loss of generality, one choice of $\vec{w}_i$ is given by the following equation:

$$\vec{w}_i = s\alpha_i \vec{i} - c\alpha_i \vec{j} \qquad (6)$$

The corresponding choice for $\vec{u}_i$ is given by $$\vec{u}_i = c\alpha_i s\beta_i \vec{i} + s\alpha_i s\beta_i \vec{j} - c\beta_i \vec{k} \qquad (7)$$

The viewing geometry is shown in FIG. 7. $\vec{u}_i$, $\vec{v}_i$ and $\vec{w}_i$ are also unit vectors. Then $$\vec{OP}_{image} = (\vec{OP} \cdot \vec{w}_i)\vec{w}_i + (\vec{OP} \cdot \vec{u}_i)\vec{u}_i$$

where $$\rho's\theta + \rho c\theta = r'(z)\rho^2 t\sigma$$

for the image of the shadow-illumination boundary.

For $\sigma = \sigma_0$ (given direction of illumination), $\theta$ is given by $\rho's\theta + \rho c\theta = r'(z)\rho^2 t\sigma_0$. Let the solution be $\theta = \theta_0$. Let the viewpoint be given by $\alpha_i = \alpha_0$ and $\beta_i = \beta_0$. Then $$\vec{OP}_{S-I(image)}(z) = OP_w(z)\vec{w}_i + OP_u(z)\vec{u}_i \qquad (8)$$

where $$OP_w(z) = r(z)(\rho(\theta_0)c\theta_0 s\alpha_0 - \rho(\theta_0)s\theta_0 c\alpha_0) \qquad (9)$$
$$= r(z)\rho(\theta_0)(c\theta_0 s\alpha_0 - s\theta_0 c\alpha_0)$$
$$= r(z)\rho(\theta_0)s(c\theta_0\alpha_0 - \theta_0 c\alpha_0)$$

and $$OP_u(z) = r(z)\rho(\theta_0)c\theta_0 c\alpha_0 s\beta_0 + r(z)\rho(\theta_0)s\theta_0 s\alpha_0 s\beta_0 - zc\beta_0 \qquad (10)$$
$$= r(z)\rho(\theta_0)s\beta_0 c(\alpha_0 - \theta_0) - zc\beta_0$$

The only variable in $\vec{OP}_{S-I(image)}$ is z. (Note that r is a function of z.) The idea is to solve for $r(z)$ using the shadow-illumination boundary in above equations. The solution is given below.

$$r(z) = \frac{OP_w(z)}{\rho(\theta_0)s(\alpha_0 - \theta_0)}$$
$$= \frac{\vec{OP}_{S-I(image)}(z) \cdot \vec{w}_i}{\rho(\theta_0)s(\alpha_0 - \theta_0)}$$

$$r(z) = \frac{OP_u(z) + zc\beta_0}{\rho(\theta_0)s\beta_0 c(\alpha_0 - \theta_0)}$$
$$= \frac{\vec{OP}_{S-I(image)}(z) \cdot \vec{u}_i + zc\beta_0}{\rho(\theta_0)s\beta_0 c(\alpha_0 - \theta_0)}$$

It is, however, not easy to implement a method directly based on this derivation because it is difficult to measure the shadow-illumination boundary in the image. Hence, a method is developed to recover the generalized cone parameters (specifically, the sweep rule) from the image of the shadow.

Theory for Shadow Image

The approach is the following. First, project the object to the surface on which the shadow is to fall. Then image the shadow. From this derive the sweep rule of the shadow from the sweep rule of the object. Invert the equation to get the sweep rule of the object from the sweep rule of the shadow.

To find the sweep rule of the 3-D generalized cone the method of the present invention does the following:

Find the axis of symmetry of the shadow ribbon. (The axis is formed by the set of Euclidean midpoints between the extremal points.)

Find the 2-D sweep rule in terms of the 3-D sweep rule and the cross-section. (This is given by the Euclidean distance between the axis and the extremal point.)

The 3-D sweep rule is then found in terms of the 2-D sweep rule. Mathematical preliminaries should first be derived and then equations for the general case (SHGC) can be derived. Equations for the special generalized cones would then follow, in each case explicitly stating the equations for the image of the sides of the shadow $\vec{OP}_i$. The two cases of flat earth, and flat earth & nadir view are both addressed.

Preliminary Mathematics

Orthographic projection for imaging and parallel rays for shadow generation are utilized. In addition, the world coordinate system is used so that the z-axis is aligned with the axis of the object and the x-y plane is parallel to the flat end of the object.

Assume the shadow plane is given by $\alpha_s$ and $\beta_s$, the azimuth and elevation angles of the normal, $\vec{u}_s$ to the shadow plane, in the world coordinate system. Then, $$\vec{u}_s = c\beta_s c\alpha_s \vec{i} + c\beta_s c\alpha_s \vec{j} + s\beta_s \vec{k}$$

$\vec{v}_s$ and $\vec{w}_s$ are chosen as follows:

$$\vec{w}_s = s\alpha_s \vec{i} - c\alpha_s \vec{j} \qquad (11)$$

$$\vec{u}_s = c\alpha_s s\beta_s \vec{i} + s\alpha_s s\beta_s \vec{j} - c\beta_s \vec{k} \qquad (12)$$

The image coordinate system is defined by Equations 6 and 7. The following dot products will be used later:

$$\vec{w}_s \cdot \vec{w}_i = s\alpha_s s\alpha_i + c\alpha_s c\alpha_i = c(\alpha_s - \alpha_i)$$

$$\vec{u}_s \cdot \vec{w}_i = c\alpha_s s\beta_s s\alpha_i - s\alpha_s s\beta_s c\alpha_i$$

$$\vec{w}_s \cdot \vec{u}_i = s\alpha_s c\alpha_i s\beta_i - c\alpha_s s\alpha_i s\beta_i$$

$$\vec{u}_s \cdot \vec{u}_i = c\alpha_s s\beta_s c\alpha_i s\beta_i + s\alpha_s s\beta_s s\alpha_i s\beta_i + c\beta_s c\beta_i$$

For convenience, the equations for the shadow-illumination boundary are rewritten. Here $\theta_j$ satisfies the following equation:

$$\rho' s\theta_j + \rho c\theta_j = r'(z)\rho^2 t\sigma_0$$

$\sigma_0$ is the known sun elevation angle. For an SHGC with $\rho$ an even function, if $\theta_j$ satisfies the above equation, so does $-\theta_j$.

For a solid of revolution, the cross-section is a circle, and $\rho(\theta)$ may be taken as 1. The above equation then becomes $$c\theta_j = r'(z)t\sigma_0$$

Therefore $$s\theta_j = \pm\sqrt{1 - (r'(z)t\sigma_0)^2}$$

For an RCLSGHC, in addition, $r(z) = k_1 z + k_0$, and the above equations become $$c\theta_j = k_1 t\sigma_0$$

Therefore $$s\theta_j = \pm\sqrt{1 - (k_1 t\sigma_0)^2}$$

For an RCCSGHC, $k_1 = 0$, and the above equations become $$c\theta_j = 0$$

Therefore

TABLE 1

GC type and location of shadow-illumination boundary.

| GC type | $c\theta_j$ | $s\theta_j$ |
| --- | --- | --- |
| SHGC ($\rho$ even) | $c\gamma_0$ | $s\gamma_0$ |

TABLE 1-continued

GC type and location of shadow-illumination boundary.

| | | |
|---|---|---|
| SOR | $r'(z) t \sigma_0$ | $\pm \sqrt{1 - (r'(z) t \sigma_0)^2}$ |
| RCLSHGC | $k_1 t \sigma_0$ | $\pm \sqrt{1 - (k_1 t \sigma_0)^2}$ |
| RCCSHGC | 0 | $\pm 1$ |

Derivation for the General Case

The derivation is as follows. First, derive the shadow coordinates.

$$\vec{OP}_s = (\vec{OP} \cdot \vec{w}_s)\vec{w}_s + (\vec{OP} \cdot \vec{u}_s)\vec{u}_s$$

where $$\vec{OP}_s = r(z)\rho(\theta_j)(c\theta_j \vec{i} + s\theta_j \vec{j}) + z\vec{k}$$

Here $\theta_j$ satisfies the following equation $$\rho' s\theta_j + \rho c\theta_j = r'(z)\rho^2 t \sigma_0$$

$\sigma_0$ is the known sun elevation angle. Or $$\vec{OP}_s = OP_{sw}\vec{w}_s + OP_{sw}\vec{u}_s$$

where $$OP_{sw} = \vec{OP} \cdot \vec{w}_s \qquad (13)$$
$$= r(z)\rho(\theta_j)(c\theta_j s\alpha_s - s\theta_j c\alpha_s)$$
$$= \rho(\theta_j)s(\alpha_s - \theta_j)r(z)$$

Or $$OP_{sw} = K_w r(z)$$
$$K_w = \rho(\theta_j)s(\alpha_s - \theta_j)$$

Similarly, $$OP_{su} = \vec{OP} \cdot \vec{u}_s \qquad (14)$$
$$= r(z)\rho(\theta_j)s\beta_s(c\theta_j c\alpha_s + s\theta_j s\alpha_s) - zc\beta_s$$
$$= r(z)\rho(\theta_j)s\beta_s c(\theta_j - \alpha_s)zc\beta_s$$

Or $$OP_{su} = K_u r(z) - zc\beta_s$$

Now derive the image coordinates as follows:

$$\vec{OP}_i = (\vec{OP}_s \cdot \vec{w}_i)\vec{w}_i + (\vec{OP}_s \cdot \vec{u}_i)\vec{u}_i$$
$$= OP_{iw}\vec{w}_i + OP_{iu}\vec{u}_i$$

$$OP_{iw} = (\vec{OP}_s \cdot \vec{w}_i)$$
$$= (OP_{sw}\vec{w}_s + OP_{su}\vec{u}_s) \cdot \vec{w}_i$$
$$= OP_{sw}(\vec{w}_s \cdot \vec{w}_i) + OP_{su}(\vec{u}_s \cdot \vec{w}_i)$$
$$= OP_{sw}c(\alpha_s - \alpha_i) + OP_{su}s\beta_s s(\alpha_s - \alpha_i)$$

$$OP_{iu} = (\vec{OP}_s \cdot \vec{u}_i)$$
$$= (OP_{sw}\vec{w}_s + OP_{su}\vec{u}_s) \cdot \vec{u}_i$$
$$= OP_{sw}(\vec{w}_s \cdot \vec{u}_i) + OP_{su}(\vec{u}_s \cdot \vec{u}_i)$$
$$= OP_{sw}s\beta_i s(\alpha_s - \alpha_i) + OP_{su}(s\beta_s s\beta_i c(\alpha_i - \alpha_s) + c\beta_s c\beta_i)$$

In the above equations, $OP_{sw}$ and $OP_{su}$ are given by equations (13) and (14). Rewriting the expressions for $OP_{iw}$ and $OP_{iu}$, we have $$OP_{iw} = OP_{sw}c(\alpha_s - \alpha_i) + OP_{su}s\beta_s s(\alpha_i - \alpha_s)$$
$$= \rho(\theta_j)s(\alpha_s - \theta_j)r(z)c(\alpha_s - \alpha_i) +$$
$$(\rho(\theta_j)s\beta_s c(\theta_j - \alpha_s)r(z) - zc\beta_s)s\beta_s s(\alpha_i - \alpha_s)$$

$$OP_{iu} = OP_{sw}s\beta_i s(\alpha_s - \alpha_i) +$$
$$= OP_{su}(s\beta_s s\beta_i c(\alpha_i - \alpha_s) = c\beta_s c\beta_i)$$
$$= \rho(\theta_j)s(\alpha_i - \theta_j)s(z)s\beta_i s(\alpha_s - \alpha_i) +$$
$$(\rho(\theta_j)s\beta_s c(\theta_j - \alpha_s)r(z) - zc\beta_s)$$
$$(s\beta_s s\beta_i c(\alpha_i - \alpha_s) + c\beta_s c\beta_i)$$

Flat Earth

Consider the case of fat earth (and the object standing vertically on flat ground). Here $\beta_s = 90$ degrees, and $\alpha_s$ may be taken as anything and is taken as 0.

$$OP_{iw} = -p(\theta_j)s(\theta_j)f(z)c(\alpha_i) + s(\alpha_i)p(\theta_j)c(\theta_j)r(z) \qquad (15)$$

$$OP_{iu} = p(\theta_j)s(\theta_j)r(z)s\beta_i s\alpha_i + p(\theta_j)c(\theta_j)r(z)s\beta_i c\alpha_i \qquad (16)$$

Therefore $$\vec{OP}_i = (-p(\theta_j)s(\theta_j)r(z)c(\alpha_i) + s(\alpha_i)p(\theta_j)c(\theta_j)r(z))\vec{w}_i +$$
$$p(\theta_j)s(\theta_j)r(z)s\beta_i s\alpha_i + p(\theta_j)c(\theta_j)r(z)s\beta_i c\alpha_i)\vec{u}_i$$

RCSHGC or Solid of Revolution (SOR)

Here $\rho(\theta) = 1$, and $r(z)$ is some general function.

$$\vec{OP}_i = (-s(\theta_j)r(z)c(\alpha_i) + s(\alpha_i)c(\theta_j)r(z))$$
$$\vec{w}_i + (s(\theta_j)r(z)s\beta_i s\alpha_i = c(\theta_j)r(z)\beta_i c\alpha_i)\vec{u}_i$$

where $\theta_j$ satisfies the following equation:

$$c\theta_j = r'(z)t\sigma_0$$

Therefore the solutions are $\theta_j = \gamma_0$ and $\theta_j = -\gamma_0$. When $\theta_{j=\gamma 0}$, $$\vec{OP}_i = (-s(\gamma_0)r(z)c(\alpha_i) + s(\alpha_i)c(\gamma_0)r(z))$$
$$\vec{w}_i + (s(\gamma_0)r(z)s\beta_i s\alpha_i + c(\gamma_0)r(z)\beta_i c\alpha_i)\vec{u}_i$$

When $\theta_j=-\gamma_0$, $$O\vec{P}_i=(s(\gamma_0)r(z)c(\alpha_i)+s(\alpha_i)c(\gamma_0)r(z))\vec{w}_i+(-s(\gamma_0)r(z)s\beta_i s\alpha_i+c(\gamma_0)r(z)\beta_i c\alpha_i)\vec{u}_i$$

The axis is given by the midpoint of the extremal points. It is given by $$\vec{OP}_a = 0.5((-s(\gamma_o)r(z)c(\alpha_i) + s(\alpha_i)c(\gamma_o)r(z))\vec{w}_i +$$
$$(s(\gamma_o)r(z)c(\alpha_i) + s(\alpha_i)c(\gamma_o)r(z)))\vec{w}_i +$$
$$0.5((-s(\gamma_o)r(z)s\beta_i s\alpha_i + c(\gamma_o)r(z)s\beta_i c\alpha_i) +$$
$$(s(\gamma_o)r(z)s\beta_i s\alpha_i + c(\gamma_o)r(z)s\beta_i c\alpha_i))\vec{u}_i$$
$$= s(\alpha_i)c\gamma_o r(z)\vec{w}_i + c\gamma_o r(z)s\beta_i c\alpha_i \vec{u}_i$$
$$= c(\gamma_o)r(z)(s(\alpha_i)\vec{w}_i + s\beta_i c\alpha_i \vec{u}_i)$$
$$= r(z)r'(z)t\sigma_o(s(\alpha_i)\vec{w}_i + s\beta_i c\alpha_i c\alpha_i \vec{u}_i)$$

The 2-D sweep rule ($SR_{2-D}$) is given by the Euclidean distance of the extremal point from the axis. This is done by component subtraction.

$$SR_{2-D}=s(\gamma_0)r(z)E$$

where $$E = \sqrt{(c^2(\alpha_i) + s^2(\alpha_i)s^2(\beta^i))}$$

Using the appropriate expression for $s(\gamma_0)$ from Table 1 we get $$SR_{2-D} = r(z)\sqrt{1 - (r'(z)t\sigma_0)^2(\beta_i))} \quad (17)$$

RCLSHGC

This is a special case of the SOR with $r(z)=k_1 z+k_0$, where $k_1$ and $k_0$ are constants.

$$\vec{OP}_i = (-s(\theta_j)(k_1 z + k_o)c(\alpha_i) + (s(\alpha_i)c((\theta_j)(k_1 z + k_o)\vec{w}_i +$$
$$(s(\theta_j)(k_1 z + k_o)s\beta_i s\alpha_i + c(\theta_j)(k_1 z + k_o)s\beta_i s\alpha_i \vec{u}_i$$

where $\theta_j$ satisfies the following equation:

$$c\theta_j=k_1 t\sigma_0$$

Therefore the solutions are $\theta_j=\gamma_0$ and $\theta_j=-\gamma_0$. When $\theta_j=\gamma_0$, $$\vec{OP}_i = (-s(\gamma_o)(k_1 z + k_o)c(\alpha_i) + (s(\alpha_i)c(\gamma_o)(k_1 z + k_o)\vec{w}_i +$$
$$(s(\gamma_o)(k_1 z + k_o)s\beta_i s\alpha_i + c(\gamma_o)(k_1 z + k_o)s\beta_i c\alpha_i)\vec{u}_i$$

When $\theta_j=-\gamma_0$, $$\vec{OP}_i = (s(\gamma_o)(k_1 z + k_o)c(\alpha_i) + (s(\alpha_i)c(\gamma_o)(k_1 z + k_o)\vec{w}_i +$$
$$(-s(\gamma_o)(k_1 z + k_o)s\beta_i s\alpha_i + c(\gamma_o)(k_1 z + k_o)s\beta_i c\alpha_i)\vec{u}_i$$

The axis is given by the Euclidean midpoint of the extremal points. It is given by:

$$\vec{OP}_a = (s(\alpha_i)c(\gamma_o)(k_1 z + k_o)\vec{w}_i + c(\gamma_o)(k_1 z + k_o)s\beta_i c\alpha_i \vec{u}_i$$
$$= k_1 t\sigma_o(k_1 z + k_o)s(\alpha_i)\vec{w}_i + s\beta_i c\alpha_i \vec{u}_i$$

The 2-D sweep rule ($SR_{2-D}$) is given by the Euclidean distance of the extremal point from the axis. This is done by component subtraction.

$$SR_{2-D}=s(\gamma_0)(k_1 z+k_0)E$$

Using the appropriate expression for $s(\gamma_0)$ from Table 1 we get:

$$SR_{2-D} = (k_1 z + k_o)\sqrt{1 - (k_1 t\sigma_o)^2} \; E$$

RCCSHGC

This is the same as RCLSHGC case with $k_1=0$.

$$O\vec{P}_i=(-s(\theta_j)k_o c(\alpha_i)+s(\alpha_i)c)\theta_j(k_0)\vec{w}_i+(s(\theta_j)k_0 s\beta_i s\alpha_i+c(\theta_j)k_0 s\beta_i c\alpha_i)\vec{u}_i$$

where $\theta_j$ satisfies the following equation:

$$c\theta_j=0$$

Therefore the solutions are $\theta_j=90$ and $\theta_j=-90$. When $\theta_j=90$, $$\vec{OP}_i = (-s(90)k_o c(\alpha_i) + s(\alpha_i)c(90)k_o)\vec{w}_i +$$
$$= (s(90)k_o s\beta_i s\alpha_i + c(90)k_o s\beta_i c\alpha_i)\vec{u}_i$$
$$= (-k_o c(\alpha_i) + 0)\vec{w}_i + (k_o s\beta_i s\alpha_i + 0)\vec{u}_i$$
$$= k_o c(\alpha_i)\vec{w}_i + k_o s\beta_i s\alpha_i \vec{u}_i$$

When $\theta_j=-90$, $$\vec{OP}_i = (-s(-90)k_o c(\alpha_i) + s(\alpha_i)c(-90)k_o)\vec{w}_i +$$
$$= (s(-90)k_o s\beta_i s\alpha_i + c(-90)k_o s\beta_i c\alpha_i)\vec{u}_i$$
$$= k_o c(\alpha_i)\vec{w}_i - k_o s\beta_i s\alpha_i \vec{u}_i$$

The axis and the 2-D sweep rule in this case are given by the following equations:

$$\vec{OP}_a=0$$

$$SR_{2-D}=k_0 E$$

Since $O\vec{P}_a=0$, we can take it along any direction, e.g., the $\vec{u}_i$-axis.

$$O\vec{P}_a=\vec{u}_i$$

Flat Earth and Nadir View

Now, in addition, consider the case of nadir (overhead) view in which the camera looks down vertically on flat ground. Here $\beta_i=90$ degrees, and $\alpha_i$ can be taken as anything and is taken as 0.

Substituting in equations (15) and (16), we get the following equations:

$$OP_{iw} = -p(\theta_j)s(\theta_j)r(z)c0 = s0p(\theta_j)c(\theta_j)r(z)$$
$$= -p(\theta_j)s(\theta_j)r(z)1 = 0p(\theta_j)c(\theta_j)r(z)$$
$$= -p(\theta_j)s(\theta_j)r(z)$$

$$OP_{iu} = p(\theta_j)s(\theta_j)r(z)s90s0 + p(\theta_j)c(\theta_j)r(z)s90s0$$
$$= 0 + p(\theta_j)c(\theta_j)r(z)1$$
$$= p(\theta_j)c(\theta_j)r(z)$$

Therefore $$O\vec{P}_i = -p(\theta_j)s(\theta_j)r\alpha(z)\vec{w}_i + p(\theta_j)c\theta_j r(z)\vec{u}_i$$

where $\theta_j$ satisfies the following equation:

$$p's\theta_j + pc\theta_j = r'(z)p^2 t\sigma_0$$

Here $\sigma_0$ is the known sun elevation angle.

RCSHGC or Solid of Revolution (SOR)

Here $p(\theta)=1$ and $r(z)$ is some general function.

$$O\vec{P}_i = -s(\theta_j)r(z)\vec{w}_i + c\theta_j r(z)\vec{u}_i$$

where $\theta_j$ satisfies the following equation:

$$c\theta = r'(z)t\sigma_0$$

Therefore the solutions are $\theta_j=\gamma_0$ and $\theta_j=\gamma_0$. When $$\theta_j=\gamma_0$$

$$O\vec{P}_i = -s(\gamma_0)r(z)\vec{w}_i + c\gamma_0 r(z)\vec{u}_i$$

When $\theta_j=\gamma0$ $$\vec{OP}_i = -s(-\gamma_o)r(z)\vec{w}_i + c(-\gamma_o)r(z)\vec{u}_i$$
$$= -(-1)s(\gamma_o)r(z)\vec{w}_i + c(\gamma_o)r(z)\vec{u}_i$$
$$= s(\gamma_o)r(z)\vec{w}_i + c(\gamma_o)r(z)\vec{u}_i$$

The 2-D axis is given by $$\vec{OP}_a = 0.5(-s(\gamma_o)r(z) + s(\gamma_o)r(z))\vec{w}_i + 0.5(c\gamma_o r(z) + c(\gamma_o)r(z))\vec{u}_i$$
$$= 0\vec{w}_i - c\gamma_o r(z)\vec{u}_i$$
$$= c\gamma_o r(z)\vec{u}_i$$
$$= r'(z)t\sigma_o r(z)\vec{u}_i$$

The sweep rule is given by the distance between the axis and the extremal point $$SR_{2-D} = s(\gamma_o)r(z)$$
$$= \sqrt{1 - (r'(z)t\sigma_o)^2}\, r(z)$$

RCLSHGC

This is the same as the SOR case with $r(z)=k_1 z+k_0$, where $k_1$ and $k_0$ are constants.

$$O\vec{P}_i = -s(\theta_j)(k_1 z+k_0)\vec{w}_i + c\theta_j(k_1 z+k_0)\vec{u}_i$$

where $\theta_j$ satisfies the following equation $$c\theta_j = k_1 t\sigma_0$$

Therefore the solutions are $\theta_j=\gamma_0$ and $\theta_j=\gamma_0$. When $\theta_j=\gamma_0$, $$O\vec{P}_i = -s(\gamma_0)(k_1 z+k_0)\vec{w}_i + c\gamma_0(k_1 z+k_0)\vec{u}_i$$

When $\theta_j=\gamma_0$, $$\vec{OP}_i = -s(-\gamma_o)(k_1 z + k_o)\vec{w}_i + c(-\gamma_o)(k_1 z + k_o)\vec{u}_i$$
$$= -(-1)s(\gamma_o)(k_1 z + k_o)\vec{w}_i + c(\gamma_o)(k_1 z + k_o)\vec{u}_i$$
$$= s(\gamma_o)(k_1 z + k_o)\vec{w}_i + c(\gamma_o)(k_1 z + k_o)\vec{u}_i$$

The 2-D axis is given by $$\vec{OP}_a = 0.5(-s(\gamma_o)(k_1 z + k_o) + s(\gamma_o)(k_1 z + k_o))\vec{w}_i +$$
$$0.5(c\gamma_o(k_1 z + k_o) + c(\gamma_o)(k_1 z + k_o))\vec{u}_i +$$
$$= 0\vec{w}_i + c\gamma_o(k_1 z + k_o)\vec{u}_i$$
$$= c\gamma_o(k_1 z + k_o)\vec{u}_i +$$
$$= k_1 t\sigma_o(k_1 z + k_o)\vec{u}_i$$

The sweep rule is given by the distance between the axis and the extremal point $$SR_{2-D} = s(\gamma_o)(k_1 z + k_o)$$
$$= \sqrt{1 - (k_1 t\sigma_o)^2}\, (k_1 z + k_o)$$

RCCSHGC

This is the same as RCLSHGC case with $k_1=0$.

$$O\vec{P}_i = -s(\theta_j)k_0\vec{w}_i + c\theta_j k_0\vec{u}_i$$

where $\theta_j$ satisfies the following equation:

$$c\theta_j = 0$$

Therefore the solutions are $\theta_j=90$ and $\theta_j=-90$. When $\theta_j=90$, $$\vec{OP}_i = -s(90)k_o\vec{w}_i + k_o c90\vec{u}_i$$
$$= k_o\vec{w}_i + 0\vec{u}_i$$
$$= k_o\vec{w}_i$$

When $\theta_j=-90$, $$\vec{OP}_i = -s(-90)k_o\vec{w}_i + k_o c(-90)\vec{u}_i$$
$$= k_o\vec{w}_i + 0\vec{u}_i$$
$$= k_o\vec{w}_i$$

The 2-D axis is given by:

$$\vec{OP_a} = 0.5(-k_o + k_o)\vec{w_i}$$
$$= 0$$

Since $\vec{OP}_\alpha = 0$, we can take it along any direction, e.g., the $\vec{u}_i$-axis.

$$\vec{OP}_\alpha = \vec{u}_i$$

The sweep rule is given by the distance between the axis and the extremal point:

$$SR_{2\text{-}D} = k_0$$

So the sweep rule in 2-D is the same as the sweep rule in 3-D in this case.

Tables 2 through 5 summarize the results of the axis and the sweep rule for flat earth, and flat earth & nadir view.

TABLE 2

GC type and the axis: flat earth

| GC type | 2-D axis |
|---|---|
| SOR | $r(z)r(z)t\sigma_o(s(\alpha_i)\vec{w_i} + s\beta_i c\alpha_i \vec{u_i})$ |
| RCLSHGC | $k_1 t\sigma_o(k_1 z + k_o)(s(\alpha_i)\vec{w_i} + s\beta_i c\alpha_i \vec{u_i})$ |
| RCCSHGC | $\vec{u_i}$ |

TABLE 3

GC type and the axis: flat earth and nadir view

| GC type | 2-D axis |
|---|---|
| SOR | $r(z)T\sigma_o r(z)\vec{u_i}$ |
| RCLSHGC | $k_1 t\sigma_o(k_1 z + k_o)\vec{u_i}$ |
| RCCSHGC | $\vec{u_i}$ |

TABLE 4

GC type and the sweep rule: flat earth

| GC type | 2-D sweep rule |
|---|---|
| SHGC (ρ even) | $r(z)\rho(\gamma_0)s(\gamma_0)E$ |
| SOR | $r(z)\sqrt{1 - (r'(z)t\sigma_0)^2}E$ |
| RCLSHGC | $(k_1 z + k_0)\sqrt{1 - (k_1 t\sigma_0)^2}E$ |
| RCCSHGC | $k_0 E$ |

TABLE 5

GC type and the sweep rule: flat earth and nadir view

| GC type | 2-D sweep rule |
|---|---|
| SHGC (ρ even) | $r(z)\rho(\gamma_0)s(\gamma_0)$ |
| SOR | $\sqrt{1 - (r'(z)t\sigma_0)^2}\, r(z)$ |
| RCLSHGC | $\sqrt{1 - (k_1 t\sigma_0)^2}\, (k_1 z + k_0)$ |
| RCCSHGC | $k_0$ |

3-D Parameters in Terms of 2-D Parameters

The 3-D sweep rule of the generalized cone can be expressed in terms of the 2-D sweep rule measured in the image. This is the inversion process. Derivation for the case of a solid of revolution is complicated because it involves the solution of a differential equation. Therefore, consider the case of the RCLSHGC (on flat earth).

$$SR_{2-d} = (k_1 z + k_o)\sqrt{1 - (k_1 t\sigma_o)^2}E \tag{18}$$

Let z' represent the measure along the axis of the shadow of the generalized cone. Then $$z' \frac{z}{t\sigma_o}$$

where z is the measure along the axis of the generalized cone, and $\sigma_0$ is the elevation angle of the sun.

Now let z" represent the measure along the axis of the image of the shadow of the generalized cone. To relate to z' to z" consider a vector $\vec{p}$ in the world coordinate system. Let it be $$\vec{p} = z'\vec{1}$$

The image of the vector $\vec{p}$ in the image coordinate system would be $$\vec{p}_i = (\vec{p}_i \cdot \vec{w}_i)\vec{w}_i + (\vec{p} \cdot \vec{u}_i)\vec{u}_i$$

Using Equations (6) and (7), in Section 3, we simplify this to $$\vec{p}_i = z's\alpha_i \vec{w}_i + z'c\alpha_i s\beta_i \vec{u}_i$$

and $$\|\vec{p}_i\| = z's^2(\alpha_i) + c^2(\alpha_i)s^2(\beta_i)$$

or $$z'' = z's^2(\alpha_i) + c^2(\alpha_i)s^2(\beta_i)$$

Let $F = s^2(\alpha_i) + c^2(\alpha_i)s^2(\beta_i)$. Then $$z'' = z'F$$

and $$z'' = \frac{z}{t\sigma_o}F$$

$$= \frac{F}{t\sigma_o}z$$

Or $$z = \frac{t\sigma_o}{F}z''$$

Note that z" varies from 0 to 1, the length of the image of the shadow, in 2-D. Correspondingly, z varies from 0 to $l(t\sigma_0/F$, the object height, h in 3-D. That is, $$h = l\frac{t\sigma_o}{F}$$

Now rewrite Equation (18), the 2-D sweep rue, in terms of z"

$$SR_{2-d}(z'') = \left(k_1\frac{t\sigma_o}{F}z'' + k_o\right)\sqrt{1-(k_1t\sigma_o)^2}\,E$$

$$= k_1\frac{t\sigma_o}{F}\sqrt{1-(k_1t\sigma_o)^2}\,Ez'' +$$

$$= k_o\sqrt{1-(k_1t\sigma_o)^2}\,E$$

This may be rewritten as $$SR_{2-D}(z'')=k_1''z''+k_0''$$

Here $$k_1'' = k_1\sqrt{1-(k_1t\sigma_o)^2}\,t\sigma_o\frac{E}{F} \quad (19)$$

$$= k_1\sqrt{1-(k_1t\sigma_o)^2}\,t\sigma_o G$$

with $$G = \frac{E}{F}$$

and $$k_o'' = k_o\sqrt{1-(k_1t\sigma_o)^2}\,E \quad (20)$$

Now, solve for $k_1$. Square both sides of Equation (19) and solve for $k_1$.

$$k_1''{}^2=k_1{}^2(1-(k_1t\sigma_0)^2)G^2t^2\sigma_0 \quad (21)$$

The solution for $k_1$ is given by solving the quadratic equation (the above equation is quadratic in $k_1{}^2$, the equation has $k_1{}^2$ and $k_1{}^4$ terms):

$$k_1 = \pm\frac{1}{t\sigma_o}\sqrt{\frac{1}{2}\pm\sqrt{\frac{1}{4}-\frac{k_1''{}^2}{G^2}}} \quad (22)$$

Next, solve for $k_0$. From Equation (20), $$k_o = \frac{k_o''}{\sqrt{1-(k_1t\sigma_o)^2}\,E} \quad (23)$$

The expression for $k_0$ can be rewritten by substituting the expression for $k_1$ in Equation 23. Note that $k_1$ is the slope of the sweep rule of RCLSHGC in 3-D, and $k_0$ may be interpreted as the radius of the end of the RCLSHGC. (If $k_1$ is always taken as positive, $k_0$ may be interpreted as the radius of the narrower end of the RCLSHGC.)

Interpretation

Some items regarding the interpretation of the above equations are given below.

Equation (21) can be used to solve for any one parameter assuming the others are known. For example, $\alpha_1$ or $\beta_1$ or $\sigma_0$ can be found.

In addition, the limiting case of illumination angles and shadow can be derived. From Equation (17), the following condition should hold for a shadow sweep rule to exist (or a shadow to exist) for an SOR:

$$1-(r'(z)t\sigma_0)^2 > 0$$

or $$(r'(z)t\sigma_0)^2 < 0$$

or $$|(r'(z)t\sigma_0)| < 1$$

or $$|t\sigma_o| < \left|\frac{1}{r'(z)}\right|$$

If the object is an RCLSHGC, we need $$|t\sigma_o| < \left|\frac{1}{k_1}\right|$$

For the case of RCCSHGC, we need $$|t\sigma_o| < \left|\frac{1}{0}\right|$$

or $$|t\sigma_o| < \infty$$

which is always true (except for the case when $\sigma_0=90$ degrees). That is, in this case we always have a shadow (except for $\sigma_0=90$ degrees). If the above conditions are violated by the illumination angle, there will be no shadow.

Note that when $\beta_i=90$ degrees (nadir view), $E^2=c^2(\alpha_1)+s^2(\beta_i)=1$ and $F^2=s^2(\alpha_i)+c^2(\alpha_i)s^2(\beta_i)=1$ and are independent of $\sigma_i$. Then, $$k_1 = \pm\frac{1}{t\sigma_o}\sqrt{\frac{1}{2}\pm\sqrt{\frac{1}{4}-k_1''{}^2}}$$

This is as expected because when the viewing elevation angle is 90 degrees, the azimuth viewing angle, $\alpha_1$ does not matter in the shadow geometry.

Note: if $k_1''=0$, $k_1=0$ as expected for RCCSHGC. That is, if the slope of the sweep rule of the shadow is zero, the slope of the sweep rule of the RCCSHGC is also zero. (This is seen from Equations 21 and 22.

If $k_1=0$ (RCCSHGC), $$k_o = \frac{k_o''}{E}$$

If the view is nadir, $E=1$ and $k_0=k_0''$. That is, the diameter of the object is the same as the width of the shadow.

Discussion on Cross-Section

Before implementation is discussed, consider briefly another role of the cross-section in shadow generation. Note that when a planar surface casts a shadow on another parallel plane, the shadow will be the same shape as the casting surface. Now consider the case of an RCSHGC with a top end parallel to the cross-section and also parallel to the flat earth. The shadow due to the top of such an object will then contain a circular arc. Therefore, for nadir and near-nadir views both the top and part of the shadow of circular cross section objects will appear as circular arcs. This observation in used in the implementation.

Implementation

This embodiment's implementation was for the cases of RCCSHGCs and RCLSHGCs. For example, oil tanks can be described as RCCSHGCs (constant sweep rule, circular cross-section, straight axis); and chimneys can be described as RCLSHGCs (linear sweep rule, circular cross-section, straight axis). The ground is usually flat in the scenes. The view may or may not be nadir.

The implementation consists of processing the shadow data to infer the shape of the object. For the classes of GCs now considered, the following is done. The shadow length is found to infer the object height. In addition, the slope and width of the image of the shadow may also be used to infer the slope and width of the sweep rule of the object. In addition, the technique for shadow length computation can be used in extensions of the present invention to more complicated objects. Furthermore, the method for slope and width uses the formula derived previously. Results for the length, slope and width are discussed later. Moreover, the preferred embodiment was implemented in C on Unix running on a SparcStation.

The preferred embodiment involves processing two sets of data related to the image. First the image is passed through a region segmentation program and the shadow region is selected. Edge detection and arc and straight line fitting routines are then run on the shadow region. From this arc and line information, the arcs corresponding to the shadow-background boundary and the shadow-object boundary can be picked out. Once these features have been distinguished, the arc and straight line fitting routines are then run on the image data. Features from the segmented data are then matched to corresponding features in the image data. Computing the shadow length is then a matter of computing the Euclidean distance between two points.

Details of the Preferred Embodiment

Figure 8:
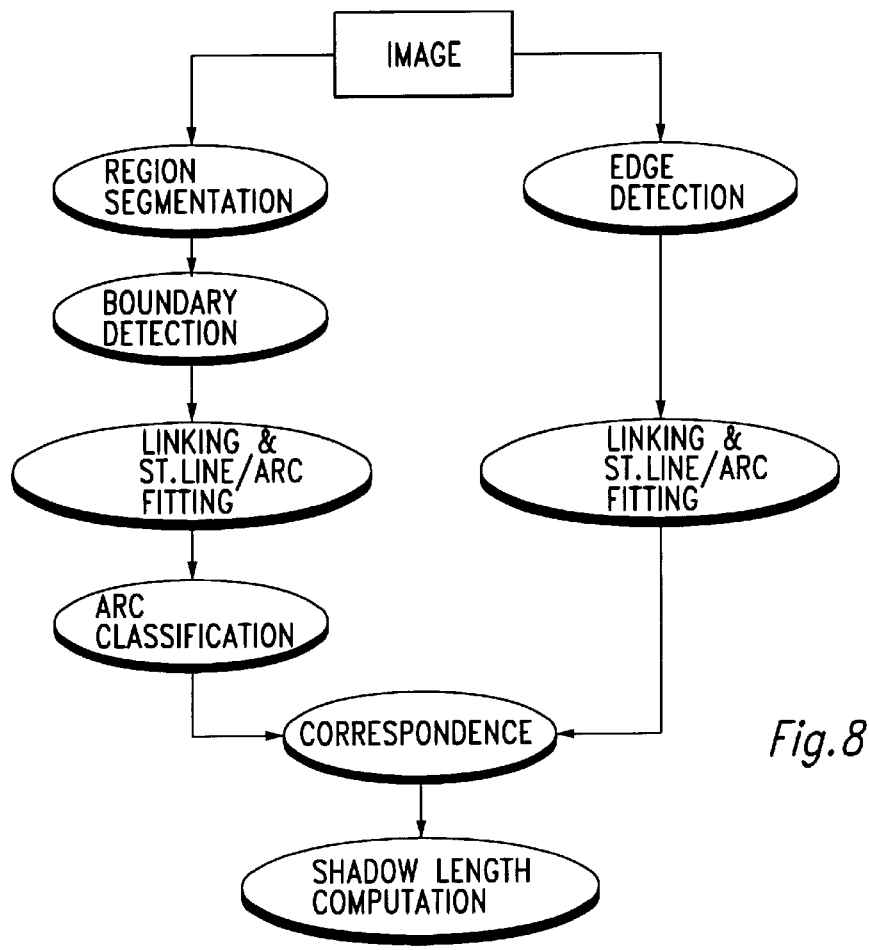
FIG. 8 shows a block diagram of the method to compute the shadow length.
Figure 9:
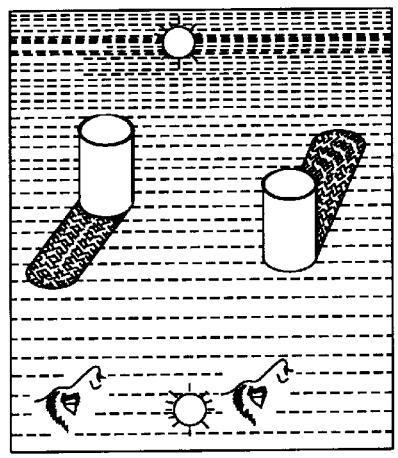
FIG. 9 shows examples of different viewing conditions; (a) shadow toward camera; and (b) shadow away from camera.
Figure 10:
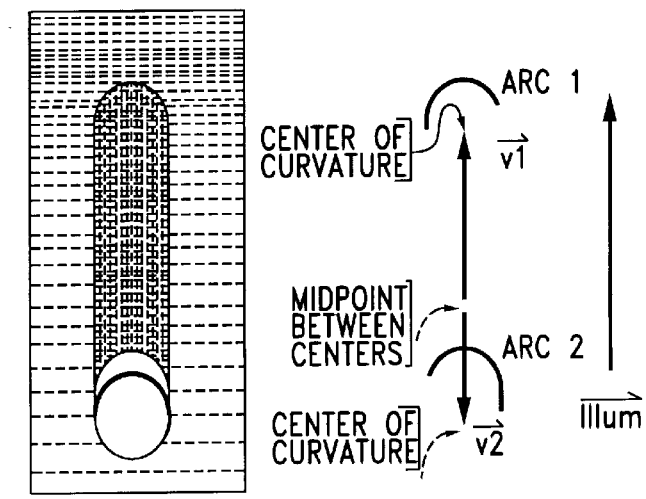
FIG. 10 shows an illustration for an arc classification method for the shadow toward camera case.
Figure 11:
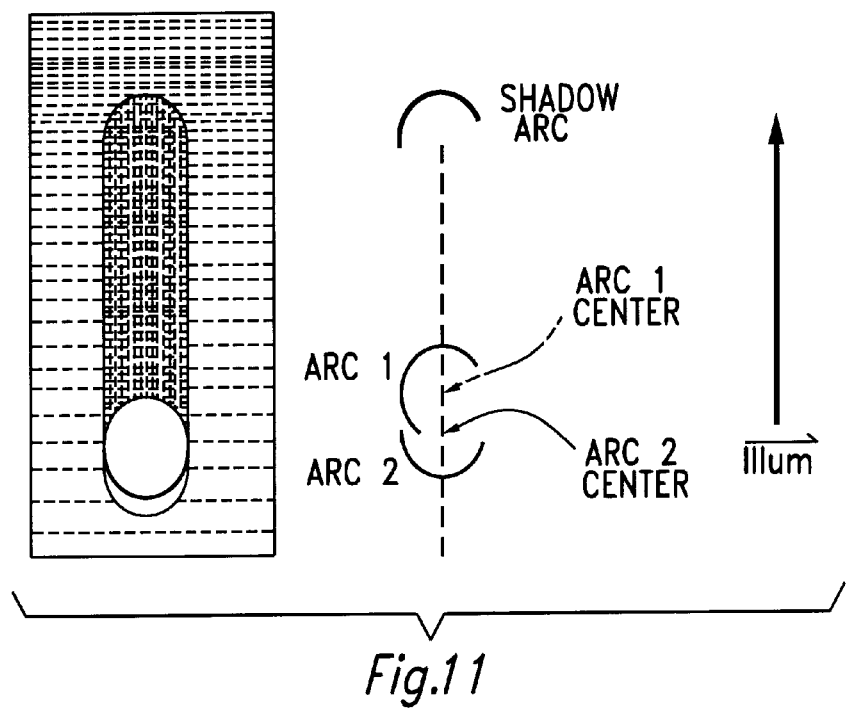
FIG. 11 shows an illustration for an arc classification method for the shadow away from camera case.

The method is designed to automatically find the length of a shadow cast by an object with a circular cross-section, given an image with one object and one shadow. FIG. 8 gives the block diagram of the preliminary implementation. The steps in the method are explained in the following paragraphs.

Shadow Finding

Shadows using region segmentation are first found. Once the shadow region is found, an edge detector is used to mark the boundaries. The pixel linker function and the straight line and circular arc-fitting function are run on this edge data using the ORT software [A. Etemadi, J. P. Schmidt, G. Matas, J. Illingworth, and J. Kittler. Low-level groupings of straight line segments. Technical report, University of Surrey, August 1992]. This gives information about the line segments and circular arcs that make up the boundary of the shadow region.

Shadow Boundary Classification

The shadow boundary is classified into shadow edge and object base edge. This is done under the assumption that both are found by the arc fitting routine to be circular arcs. Two distinct cases must be handled: shadows cast toward the camera and shadows cast away from the camera. FIG. 9(a) illustrates a shadow cast toward the camera, and FIG. 9(b) illustrates a shadow cast away from the camera. In the former case, the base of the object's boundary with the shadow is always visible (in the one object, one shadow case). In the latter, part of the boundary may be occluded by the object.

Choosing the Shadow-Base Pair

First (if there are more than two arcs in the segmented data) the pair of arcs most likely to correspond to the object base-shadow edge pair must be picked. A number of attributes can be used to shrink the set of possible pairs. Some characteristics that would eliminate an arc or pair of arcs are the following:

Curvilinearity

Nearly opposite curvatures

Very small length (because of the inaccuracy of arc radius measurements)

Each pair of arcs in the segmented data is given a "closeness" rank based on the above criteria, and the pair with the best rank is selected.

Shadow Toward Camera

Handling of shadows cast toward the camera is straightforward. Once the correct pair is chosen, each of the arcs is labeled as either a shadow or a base edge. This is done by determining which arc is farther away from the illumination source. First, the midpoint of the line between the centers of curvature of the arcs is found. From this point two vectors are defined, one from the midpoint of the connecting line to the midpoint of each arc. The angle between each of these vectors and the illumination vector (as projected into the image) is found and the vector making the smaller angle is assumed to point at the shadow edge arc.

FIG. 10(a) shows an idealized example of the shadow-toward-viewer case. FIG. 10(b) shows arcs typical of the kind that are output from the segmentation and arc-fitting routines. In this case, Arc 1 would be chosen as the shadow edge because $\vec{v}1$ makes the smallest angle, zero degrees, with the illumination vector. Under ideal conditions, the angle between the shadow vector and the illumination vector would always be zero (i.e., the line connecting centers of curvature would be exactly parallel to the illumination line), but since this is rarely the case, the smaller angle is used.

Shadow Away from Camera

This case is more complicated because the shadow/object-base boundary is not visible. The shadow edge is found in the same manner as above, using the top instead of the base for reference. The base must be located, however, by exploiting the fact that its center must lie on a line staring at the shadow arc center, extending along the illumination direction back toward the light source. All of the arcs with centers on or suitably near this line that have the desired radius of curvature are chosen as possible bases. In the one object, one shadow case, the arc from this set that is most distant from the shadow arc is the base. For example, in FIG. 11(b) the shadow arc has already been identified. Arcs 1 and 2 are the only ones with centers along the line starting at the shadow arc center and extending back toward the illumination source. Since Arc 2 is farthest from the shadow arc, it is chosen as the base arc.

Region-Edge Correspondence

This involves the correspondence of the the shadow and object base arcs from the segmented data to arcs in the image data. This is done by finding the arc in the image with the shortest total distance from a given arc in the segmented data. This total distance is defined as the sum of the distance between centers, the distance between midpoints, and difference between the radii of curvature. All of the arcs in the image are looped through and the ones closest to the shadow and object base arcs are found. In the case that no suitable arc is found, the arc from the segmented data is used. The segmented data could be used without any attempt at correspondence to image features, but this would reduce length measurement accuracy.

Computing Shadow Length

The shadow length, L, is computed using the following formula:

$$L = D - R_b + R_s$$

Figure 12:
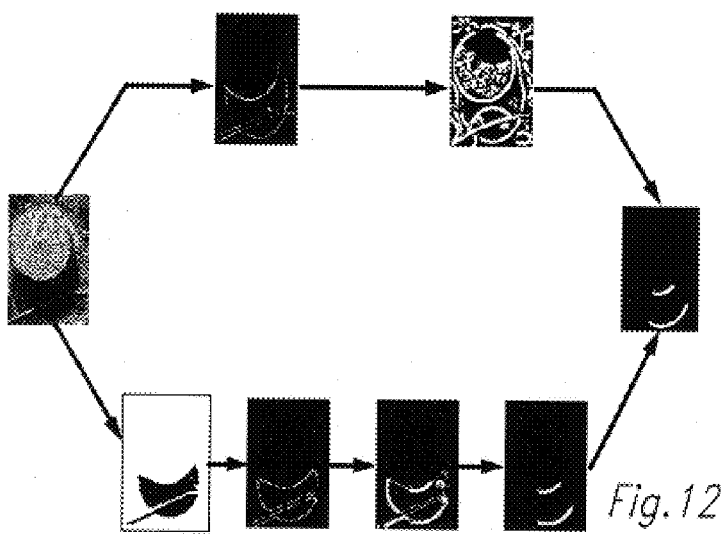
FIG. 12 shows a flow diagram of intermediate results for shadow length computation.

Here D is the distance between shadow and base arc centers; $R_s$ is the shadow arc radius; and $R_b$ is the base arc radius. As explained earlier, the base and shadow arcs can be assumed to be circles since we are assuming flat earth and nadir view. Shadow center to base center seems, at first glance, to be the simplest and most accurate way to calculate shadow length. It turns out, however, that considering radii greatly improves calculation accuracy. In fitting arcs to the shadow data, often artifacts such as the merging of the shadows of a circular top and a straight side cause errors in the estimation of radius of curvature. These errors are included in a length measure that only uses distance between centers. By subtracting the base radius and adding the shadow radius, these errors are eliminated, giving a much more accurate measure. FIG. 12 illustrates the entire shadow length computation process for image number 6. Each image in this figure corresponds to a step shown in FIG. 8.

Sun Angle Computation

Once the shadow length has been determined, the height of the object can be calculated using the sun elevation angle. This angle can be found using the following equations taken from Harold M. Woolf. [On the Computation of solar elevation angels and the determination of sunrise and sunset times. Technical Report N68 35179, Environmental Science Services Adminstration, Weather Bureau, National Meteorological Center, September 1968.]

The solar elevation angle, $\alpha$, is given by $$\sin \alpha = \sin \theta \sin D + \cos \theta \cos D \cos h\theta$$

is the latitude and D, the solar declination angle is given by $$\sin D = (\sin 23° \ 26'37.8") \sin \sigma$$

where $$\sigma = 279.9348 + d + 1.914827 \sin d - 0.079525 \cos d + 0.019938 \sin 2d - 0.00162 \cos 2d$$

and d, the angular fraction of a year elapsed up to a given date, is given by $$d = [(\text{No. of days in year}) - 1] * 360/365.242$$

where h, the solar hour angle, is given by $$h = 15(T - M) - L$$

where T is the Greenwich Mean Time and M is the true solar noon, defined by $$M = 12 + 0.12357 \sin d - 0.004289 \cos d + 0.153809 \sin 2d + 0.060783 \cos 2d.$$

Using these formulae, knowledge of date and time of imaging, and location of a scene, the solar elevation angle can be found. From the length of the shadow and the elevation angle, the height of the object can be computed.

Results

The preferred embodiment had positive results. Errors in results are computed as percentage of manually measured length. For synthetic images, the errors were on the order of less than 1 pixel out of 100 to 200 pixels. This was due to manual measurements rather than errors in the program. The method was also tested on some real aerial images. The system correctly computed the shadow length in 9 out of 10 cases. Table 6 shows the computational precision. (We did not convert the shadow length to object height using the above formulae because ground truth and calibration information was not available on these images.)

TABLE 6

Comparison of automatic an manual measurements of shadow length. Man. Len. stands for manually computed length. Auto. Len stands for automatically computed length. Error is percentage of manual length.

| Image # | Man. Len. | Auto. Len. | error |
|---------|-----------|------------|-------|
| 1 | 17.1 | 17.0 | -0.9 |
| 2 | 15.2 | 15.0 | -1.2 |
| 3 | 16.1 | 15.8 | -1.7 |
| 4 | 15.1 | 14.8 | -2.0 |
| 5 | 32.4 | 3.0 | 2.0 |
| 6 | 32.8 | 31.9 | -2.7 |
| 7 | 14.3 | 14.8 | 3.0 |
| 8 | 21.4 | 22.0 | 3.2 |
| 9 | 13.3 | 12.4 | -5.6 |
| 10 | 31.3 | 25.4 | -18.8 |
| 11 | 14.1 | failed | ** |

Figure 13:
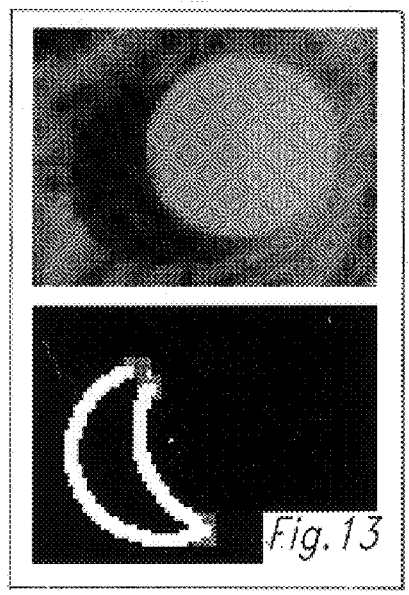
FIG. 13 shows (a) a subimage from FIG. 1 (image number 1 from table 6) and (b) circular arcs found from FIG. 1.
Figure 15:
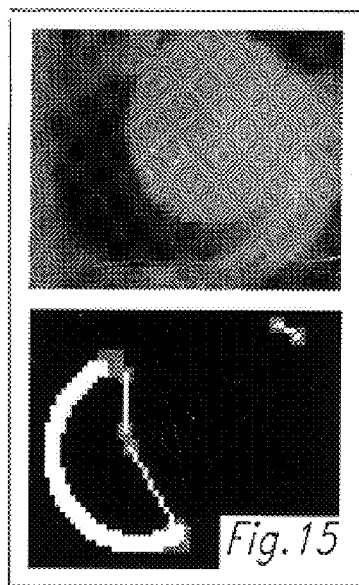
FIG. 15 shows (a) a subimage from FIG. 1 (image number 11 from table 6) and (b) circular arcs found.
Figure 14:
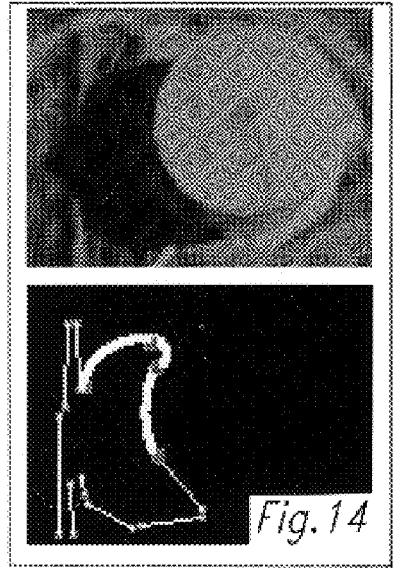
FIG. 14 shows (a) a subimage from FIG. 1 (image number 10 from table 6) and (b) circular arcs found.

Three images from the sample set in Table 6 are shown in FIGS. 13 through 15. All of the images in the table are subimages of the image in FIG. 1. These images were chosen because they demonstrate the different possible outcomes of length computation by this system. Image number 1, shown in FIG. 13(a), produces very clean arcs in the segmented data, FIG. 13(b), and consequently the measurement is accurate.

In image number 10, the shadow is distorted because it falls on an embankment [FIG. 14(a)]. This distortion propagates through to the calculation of the shadow arc's center of curvature which in turn corrupts the shadow length measurement. As illustrated in Table 6, the measurement is 18.8 percent off. FIG. 14(b) demonstrates that there is no arc along the illumination direction from the base because of the distortion. Because of this, an arc formed by the merging of the shadows of the circular top and the straight side of the tank must be used. This merging causes an error in the calculation of the shadow arc's radius of curvature and therefore an error in length computation.

Figure 16:
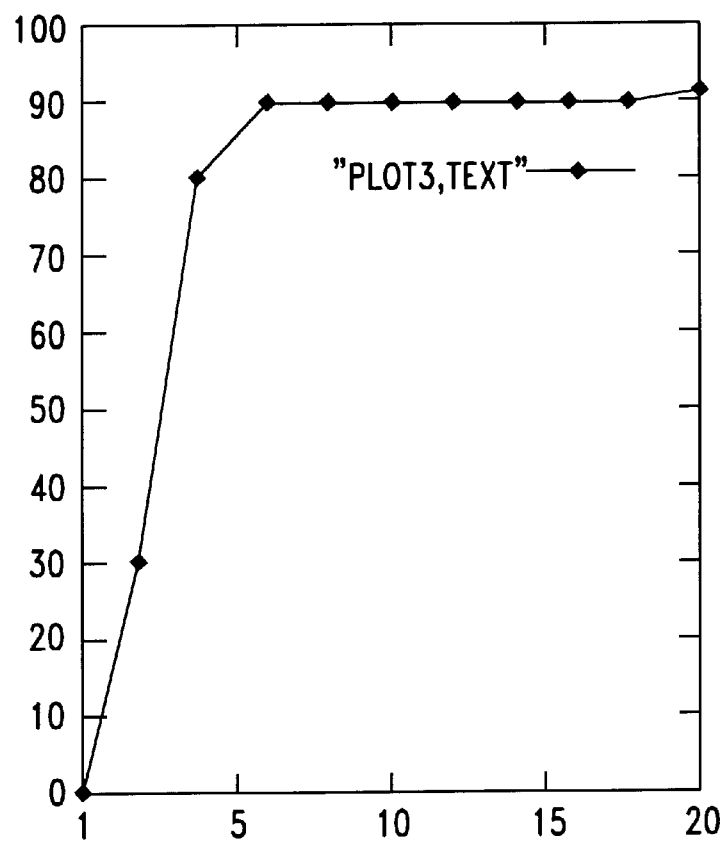
FIG. 16 shows a graph of the performance of the shadow length method.

When the arc finder performed well, the results were nearly as good as those from the artificial images. The one problem was the inability of the arc finder to correctly identify the relevant arcs in certain cases. Such a case arises in the analysis of image number 11 (FIG. 15). For this image, only one arc appears in the shadow data and therefore the system has no means of identifying the relevant shadow boundaries. Consequently, no shadow length computation can be made. FIG. 16 summarizes the results for the set of test images.

Figure 17:
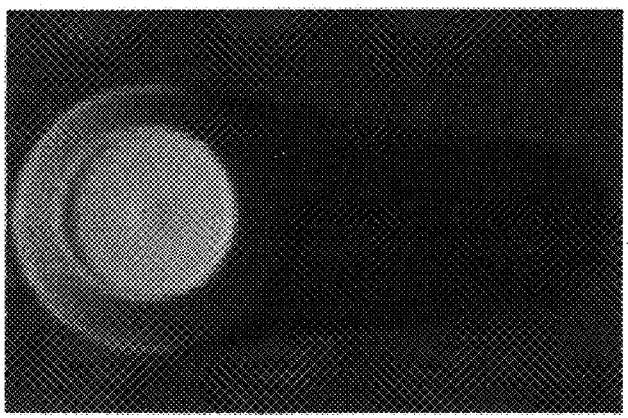
FIG. 17 shows an image showing the nadir view ($\alpha_i=90$ degrees and $\beta_i=90$ degrees) of an object describable as an RCLSHGC.

The sweep rule calculation for RCLSHGCs was performed on images from different viewpoints. In FIG. 17 an RCLSHGC with a slope of 0.152 was imaged with $\alpha_i$ equal to 90 degrees and $\beta_i$ equal to 90 degrees (nadir view). From Equation 22 and the manually measured slope of the shadow sides with respect to the shadow of the axis of the cup, as projected into the image, the 3-D slope is calculated to be 0.160. We repeated the experiment with $\beta_i$ equal to 30 degrees and got a 3-D slope of 0.157. As we can see, the computed slope and the actual 3-D slope are nearly equal. This verifies Equation 22 and the derivation in the previous section.

The small errors in these measurements are probably a reflection of the difficulty of accurately measuring the slope in the image by hand. For example, in this image a 1/200 change (which is equivalent to a one pixel error) in the image slope translates to a 10 percent change in the estimated 3-D slope. These errors are caused not by error amplification inherent in the formula. Rather, they are caused by the fact that very small slopes are being dealt with and minute changes represent large percentage changes. Table 7 summarizes the calculations.

TABLE 7

Results of 3-D from 2-D slope calculation. Actual slope is 0.152.
Errors are percentage of actual slope.

| Image # | $\alpha_i$ | $\beta_i$ | Computed Slope | Error(%) |
| --- | --- | --- | --- | --- |
| 1 | 90 degrees | 90 degrees | 0.160 | 5% |
| 2 | 90 degrees | 90 degrees | 0.157 | 3% |

For the image in FIG. 17, the illumination elevation angle is 30 degrees. The top of the object and its shadow have a diameter of approximately 52 pixels. The apparent shadow diameter, $k_0'''$, is 52 pixels and the real world object slope, $k_1$, is 0.16 (from Table 7). Substituting these values into equation 20, we get an estimated top diameter of 52.2 pixels. This represents an error of 0.3% which for this image is less than a millimeter.

Yet another embodiment may contain modifications that incorporate the RADIUS Common Development Environment (RCDE) [J. L. Mundy, R. Welty, L. Quam, T. Strat, W. Bermner, M. Horwedel, D. Hackett, and A. Hoogs. The RADIUS Common Development Environment. In *Proceedings of the DARPA Image Understanding Workshop,* pages. 215–226, San Diego, Calif., January, 1992.]. For example, the present invention could use the RCDE to display the reconstructed 3-D curved objects.

In addition, the present invention is quite novel from previous work. In S. A. Shafer and T. Kanade, supra (Shafer and Kanade), the authors work in gradient space and derive the gradient of the object surface at the shadow-illumination boundary. The present invention, on the other hand, derives the generalized cone parameters. For example, the slope of the sweep rule is derived, whereas Shafer and Kanade derive the slope at the shadow-illumination boundary on the object surface (these are different).

Furthermore, the work by A. Huertas and R. Nevatia. [Detection of buildings in aerial images using shape and shadows. In *Proceedings International Joint Conference on Artificial Intelligence,* October 1983.] focuses on classification and correspondence of edge segments rather than on 3-D shape inference. The present invention, on the other hand, is designed specifically for the recovery of shape information from aerial photographs of curved 3-D objects. Instead of working with line segments alone, the present invention also fits circular arcs where possible and work directly with them.

Additionally, the present method for classification uses illumination in much the same manner described by A. Huertas and R. Nevatia, supra, but it does not require information about image intensity in the neighborhood of the edge. The fact that the present invention works with circular arcs directly instead of straight line segments makes this possible, because assumptions about orientation and curvature greatly constrain the number of possible interpretations of a circular arc.

An article by J. R. Kender and E. M. Smith [Shape from darkness: deriving surface information from dynamic shadows. In *International conference on Computer Vision,* pages 539–546, London, U.K., June 1987.] describes a method for shape from darkness. The method is based on a moving light source and is like photometric stereo. It is good for textured regions and is not suited for single object shape reconstruction.

Other related work focuses on generalized cones and SHGCs. However, the present invention uses the shadow to infer the shape of generalized cones, whereas the other work does not. Related work in the RADIUS research program also exists. However, most of that research concentrates on rectangular objects, whereas the present invention focuses on curved 3-D objects.

Some of the potential applications of this technology are the following: providing new modeling capability for mapping sites with curved objects; providing the capability of automatic mensuration of curved objects (e.g., oil tank capacity estimation); and enabling pre-mission briefing of future missiles for targets in areas of curved 3-D objects. This list of potential applications is not exhaustive and meant to only illustrate an example of some of the possible applications. Other applications could also be implemented by the present invention.

Various modifications have already been described but other modifications and combinations of the illustrative embodiments, as well as other embodiments of the invention, will be apparent to persons skilled in the art upon reference to the description. It is therefore intended that the appended claims encompass any such modifications or embodiments.

We claim:

1. A method of describing 3-D object from only a single aerial images using shadows, said method comprising:
   a. extracting shadow information from said aerial image; and
   b. reconstructing 3-D objects from said shadow information.

2. A system for describing 3-D objects from only a single aerial images using shadows, said system comprising:
   a. means for extracting shadow information from said aerial image; and
   b. means for reconstructing a 3-D object from said shadow information.

3. The system of claim 2 wherein the means for extracting shadow information further comprises:
   a. means for identifying the shadow region of an object to be reconstructed;
   b. means for identifying the shadow boundary as shadow edge and object base edge;
   c. means for computing the shadow length; and
   d. means for calculating the height of the object using a sun elevation angle.

4. The system of claim 3 wherein the means for reconstructing a 3-D object from said shadow information further comprises means for inferring the slope and width of the sweep rule, describing how the size of the cross section changing with the shape remaining constant, of said object to be reconstructed from the slope and width of the image of the shadow.

5. The system of claim 2 wherein the means for reconstructing a 3-D object from said shadow information further comprises means for inferring the slope and width of the sweep rule, describing how the size of the cross section changing with the shape remaining constant, of said object to be reconstructed from the slope and width of the image of the shadow.

* * * * *